(12) United States Patent
Lindoff et al.

(10) Patent No.: US 9,210,603 B2
(45) Date of Patent: Dec. 8, 2015

(54) TECHNIQUE FOR PERFORMING PHYSICAL LAYER MEASUREMENTS

(71) Applicant: Optis Wireless Technology, LLC, Plano, TX (US)

(72) Inventors: Bengt Lindoff, Bjärred (SE); Robert Baldemair, Solna (SE); Lars Sundström, Södra Sandby (SE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

(21) Appl. No.: 14/605,862

(22) Filed: Jan. 26, 2015

(65) Prior Publication Data

US 2015/0139019 A1 May 21, 2015

Related U.S. Application Data

(63) Continuation of application No. 13/512,358, filed as application No. PCT/EP2010/007167 on Nov. 25, 2010, now Pat. No. 8,942,171.

(60) Provisional application No. 61/265,069, filed on Nov. 30, 2009.

(51) Int. Cl.
| | |
|---|---|
| *H04W 24/08* | (2009.01) |
| *H04L 25/03* | (2006.01) |
| *H04W 24/10* | (2009.01) |
| *H04W 72/08* | (2009.01) |
| *H04W 72/12* | (2009.01) |
| *H04W 36/00* | (2009.01) |

(52) U.S. Cl.
CPC ......... *H04W 24/08* (2013.01); *H04L 25/03343* (2013.01); *H04W 24/10* (2013.01); *H04W 36/0088* (2013.01); *H04W 72/082* (2013.01); *H04W 72/1231* (2013.01)

(58) Field of Classification Search
CPC . H04L 1/1887; H04L 25/03343; H04L 5/006; H04L 5/14
See application file for complete search history.

(56) References Cited

U.S. PATENT DOCUMENTS

| | | | | |
|---|---|---|---|---|
| 8,023,955 | B2* | 9/2011 | Anderson | 455/450 |
| 8,619,747 | B2* | 12/2013 | Terry et al. | 370/344 |

(Continued)

*Primary Examiner* — Raj Jain
(74) *Attorney, Agent, or Firm* — Vincent J. Allen; James H. Ortega; Carstens & Cahoon, LLP

(57) ABSTRACT

The present disclosure relates to a technique for performing physical layer measurements on a frequency resource relative to other frequency resources in a telecommunications system operable to communicate over multiple frequency resources. A method aspect of this technique includes determining that a mobile terminal is to perform a physical layer measurement with regard to a first frequency resource, determining if there is data to be communicated over one or more second frequency resource(s) within a time period wherein the first frequency resource is distinct from the second frequency resources: if it is determined that there is no data to be communicated over the second frequency resource(s) within the time period, performing the physical layer measurement on the first frequency resource and forming a quality measure of the first frequency resource based on the physical layer measurement; or if it is determined that there is data to be communicated over the second frequency resource(s) within the time period, modifying the physical layer measurement and forming a quality measure of the first frequency resource based on the modified physical layer measurement.

26 Claims, 10 Drawing Sheets

(56) References Cited

U.S. PATENT DOCUMENTS

| | | | |
|---|---|---|---|
| 8,693,463 B2* | 4/2014 | Kazmi et al. | 370/352 |
| 2001/0016482 A1* | 8/2001 | Bergstrom et al. | 455/332 |
| 2008/0268833 A1* | 10/2008 | Huang et al. | 455/425 |
| 2012/0307660 A1* | 12/2012 | Lindoff et al. | 370/252 |

* cited by examiner

TECHNIQUE FOR PERFORMING PHYSICAL LAYER MEASUREMENTS

TECHNICAL FIELD

The present disclosure generally relates to a measurement technique for a telecommunication system. In particular, a technique for performing physical layer measurements on a frequency resource relative to one or more other frequency resources in an evolved Universal Terrestrial Radio Access Network or similar telecommunication network is presented.

BACKGROUND

The Universal Terrestrial Radio Access Network (UTRAN) of the Long-Term Evolution (LTE) project, also denoted E-UTRAN, as standardized in Rel-8 of the 3rd Generation Partnership Project (3GPP) specification, supports transmission bandwidths spanning a contiguous spectrum portion. In order to meet requirements for International Mobile Telecommunications-Advanced (IMT-Advanced) standards, 3GPP has initiated work on LTE-Advanced. One aspect of LTE-Advanced is support for bandwidth aggregation across a larger spectrum range. Another aspect of LTE-Advanced is to allow for backward compatibility.

To allow for an expanded bandwidth for data communication to and from a mobile terminal, LTE-Advanced systems may be operable to aggregate contiguous or non-contiguous spectrum portions and thereby—from a baseband point of view—allocate a large system bandwidth. Carrier aggregation, as defined by 3GPP, is non-contiguous if two frequency resources are separated by a frequency gap. Carrier aggregation without a frequency gap is called contiguous. In the aggregation example illustrated in FIG. 1, a pair of contiguous frequency resources of 10 MHz and 20 MHz are aggregated together with a non-contiguous frequency resource of 20 MHz, resulting in an aggregated bandwidth of 50 MHz available for data communications.

The benefit of aggregating frequency resources across a spectrum is that it becomes possible to generate a sufficiently large bandwidth for supporting data rates up to (and above) 1 Gbit/s, a throughput requirement for a "4G" (IMT Advanced) system. Furthermore, aggregating across the spectrum also makes it possible to adapt the spectrum portions to the current situation and geographical position, making such a solution very flexible.

A straightforward evolution of current cellular systems, like LTE, to support non-contiguous spectrum is to introduce a multi-carrier concept. That means that each frequency resource (or spectrum "chunk", see FIG. 1) represents a "legacy LTE" system and a "4G" mobile terminal is capable to receive multiple number of 3GPP Release 8 LTE carriers (called component carriers) of different bandwidths transmitted at different carrier frequencies.

Through the above-described aggregation techniques, LTE-Advanced systems may be operable to transmit and/or receive on multiple frequency resources which may be contiguous or on different portions of the spectrum. In a system utilizing multiple frequency resources, it is not optimal, in terms of power consumption (for example, for a battery operated mobile terminal) to receive control signaling on all or across multiple frequency resources. For example, a mobile terminal may be idle or transmitting only voice such that only the capacities of a single frequency resource may be required. When a single frequency resource provides adequate throughput for data to/from the mobile terminal, transmitting across two or more frequency resources will be wasteful, requiring, for example, unnecessary scheduling across frequency resources and increased power consumption.

Therefore, the mobile terminal may be configured to transmit and/or receive control information and data on the selected frequency resource only. When receiving/transmitting data amounts requiring a larger throughput or greater speed, the mobile terminal may receive/transmit data and control signaling on other available frequency resources as well as on the selected frequency resource. The concept of using a selected frequency resource for control signaling may be referred to as anchor, or primary, component carrier use, and the selected frequency resource for a mobile terminal may be referred to as the anchor component carrier for this mobile terminal. Anchor component carrier and further component carriers are sometimes also referred to as primary (component) carrier and secondary or supplementary (component) carriers, respectively.

SUMMARY

It is an object of the technique disclosed herein to provide for performing physical layer measurements, for example in the context of measuring a frequency resource. In particular, a technique is needed that allows for managing performing physical layer measurements to avert or prevent resultant transients from disturbing communication or potential communication over frequency resources.

To this end, according to a first aspect, a mobile terminal configured to perform physical layer measurements on a frequency resource is provided. The mobile terminal is configured to determine that it is to perform a physical layer measurement with regard to a first frequency resource and determine if there is data to be communicated over one or more second frequency resource(s) within a time period, wherein the first frequency resource is distinct from the second frequency resource(s). If it is determined that there is no data to be communicated over the second frequency resource(s) within the time period, the mobile terminal performs the physical layer measurement on the first frequency resource and forms a quality measure of the first frequency resource based on the physical layer measurement. If, however, it is determined that there is data to be communicated over the second frequency resource(s) within the time period, the mobile terminal modifies the physical layer measurement and forms a quality measure of the first frequency resource based on the modified physical layer measurement. Those of skill in the art refer to the modifying of a physical layer measurement as discussed herein also as "adjusting" the physical layer measurement.

In aspects of the above, the relevant time period is based on a switching on time for switching on reception on the first frequency resource. For example, the time period may be longer than the corresponding switching time. The time period may be selected to span a time period over which transients due to the measurement and/or switching on/off die down.

In aspects of the above, the physical layer measurement comprises performing multiple signal measurements, where an example of such a physical layer measurement is a Layer 1 (L1) (as defined by the OSI model) measurement. These multiple signal measurements may be performed on the first frequency resource serially over time, wherein a signal measurement measures the first frequency resource at a point in time. Measuring the first frequency resource at a point in time is also referred to by those of skill in the art as taking a "snap shot" of the frequency resource (because a snap shot of the state of the frequency resource at a point in time is taken).

Those of skill in the art further refer to the discussed signal measurement as a "snap shot measurement", or "snap shot" for short. Such signal measurements may include one or more of a signal strength, a noise, a signal-to-noise, an interference, a signal-to-interference, an Received Signal Strength Indication (RSSI), a Reference Signal Received Quality (RSRQ), and a Reference Signal Received Power (RSRP) measurement.

In various aspects, modifying the physical layer measurement may include skipping a signal measurement and forming the quality measure of the first frequency resource without the skipped signal measurement, utilizing a previously performed signal measurement of the first frequency resource to form the quality measure of the first frequency resource, and/or upon determining that a signal measurement on the first frequency resource is overdue, performing a delayed signal measurement on the first frequency resource, and utilizing the delayed signal measurement to form the quality measure of the first frequency resource. Modifying the physical layer measurement, for example by skipping a signal measurement on the first frequency resource, may allow for avoiding switching on reception on the first frequency resource during communication over one or more of the second frequency resources, thus avoiding generating transients which may interfere with communication.

A mobile terminal configured to perform the technique presented herein or elements thereof may determine that a signal measurement on the first frequency resource is overdue by starting a signal measurement timer upon determining that a physical layer measurement is to be performed and, subsequent to starting the signal measurement timer, determining that said signal measurement timer has expired.

As part of the above aspects, the mobile terminal may be further configured to decode a data portion received during switching on reception on the first frequency resource. As a possible alternative or additional measure, the mobile terminal may transmit a negative acknowledgement (NAK) in response to receiving a data portion during switching on reception on the first frequency resource and subsequently rely on retransmissions to decode a data portion received over the second frequency resource(s).

The mobile terminal may switch off reception on the first frequency resource subsequent to forming the quality measure of the first frequency resource if the first frequency resource is not needed for communication or other functions.

As a corollary to, or as a further aspect, managing switching off of a frequency resource involves a mobile terminal deciding to switch off reception on a first frequency resource and determining if there is data to be communicated over the second frequency resource(s) within a time period. If it is determined that there is no data to be communicated over the second frequency resource(s) within the time period, the mobile terminal switches off reception on the first frequency resource or if it is determined that there is data to be communicated over the second frequency resource(s) within the time period, delays switching off reception on the first frequency resource until after no further data is assigned to the mobile terminal. The time period may be based on a switching off time for switching off reception on the first frequency resource (e.g., may be longer than the corresponding switching time).

For example, the mobile terminal may decide to switch off reception on the first frequency subsequent to a (e.g., modified) physical layer measurement on the first frequency resource which may have been performed in accordance with discussed aspects. Still further, delaying switching off reception on the first frequency resource may encompass delaying switching off reception on the first frequency resource until the mobile terminal has no data scheduled to be communicated during a duration spanning the time period and/or within the time window needed to switch off. Delaying switching off reception on the first frequency resource allows the data to be communicated before the generation of disruptive transients caused by switching off reception on the first frequency resource. As will be understood by those of skill in the art, while the above technique and aspects of the same have been illustrated with regard to a mobile terminal, the technique may also be expressed or encapsulated in a method.

The technique presented herein may be realized in the form of software, in the form of hardware, or using a combined software/hardware approach. As regards a software aspect, a computer program product comprising program code portions for performing the steps presented herein when the computer program product is run on one or more computing devices is provided.

The computer program product may be stored on a computer-readable recording medium such as a memory chip, a CD-ROM, a hard disk, and so on. Moreover, the computer program product may be provided for download onto such a recording medium.

BRIEF DESCRIPTION OF THE DRAWINGS

Further aspects and advantages of the technique presented herein will become apparent from the following description of embodiments and the accompanying drawings, wherein.

DETAILED DESCRIPTION

In the following description of embodiments, for purposes of explanation and not limitation, specific details are set forth (such as particular communication system configurations and sequences of steps) in order to provide a thorough understanding of the present disclosure. It will be apparent to one skilled in the art that the technique presented herein may be practiced in other embodiments that depart from these specific details. For example, it is evident that the technique presented herein is not restricted to be implemented in LTE-Advanced systems exemplarily described hereinafter, but may also be used in conjunction with other telecommunication systems.

Moreover, those skilled in the art will appreciate that the functions and steps explained herein below may be implemented using software functioning in conjunction with a programmed microprocessor, an Application Specific integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the functions and steps disclosed herein.

Figure 1:
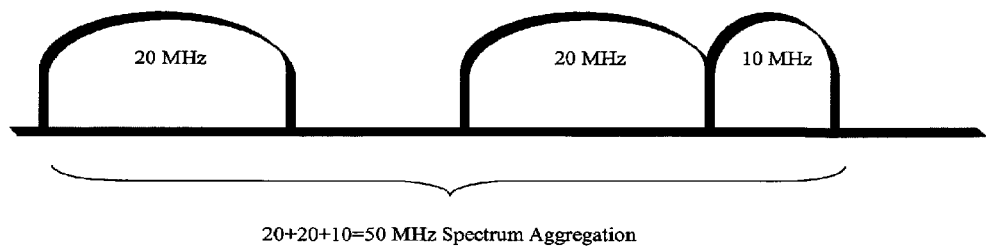
FIG. 1 schematically illustrates an example of a possible aggregation of multiple frequency resources across a bandwidth spectrum.

LTE-Advanced systems are designed to transmit across multiple frequency resources as illustrated in FIG. 1. In order to allow for backwards compatibility, the bandwidth or spectrum transmitted upon by an LTE-Advanced system is aggregated from frequency resources which are themselves backwards compatible. In one scenario, a frequency resource may be a component carrier as utilized by an LTE legacy system. In an implementation example, a component carrier, and thus a frequency resource, may have a bandwidth up to 20 MHz and may be composed of resource blocks (comprising subcarriers) which may be transmitted over.

More specifically, a frequency resource may be thought of as a series of resource blocks having a bandwidth spanning a portion of a spectrum and existing for a span of N consecutive symbols in the time domain. Such time domain symbols may be OFDM or SC-FDMA symbols, and the bandwidth of the resource block may span or include M subcarriers. Thus a resource block is a block of N×M resource elements. Accordingly, LTE-Advanced systems have the potential to transmit upon multiple frequency resources, the individual frequency resources having the potential for different bandwidths. Examples of resource blocks are further discussed in the 3GPP Technical Specification 36.211 V8.7.0 (2009-05).

The introduction of frequency resource aggregation in wireless systems calls for mobile terminals having the flexibility to reconfigure their radio transceiver resources depending on which frequency resources are switched on (i.e., actually or potentially carrying control and/or traffic data for that mobile terminal) at a given point in time. A brute-force transceiver design might have multiple and independent transceiver entities, e.g., one for each frequency resource or perhaps one for each set of contiguous frequency resources. More elaborate receiver and transmitter architectures that are specifically tailored for frequency resource aggregation may be unable to reconfigure on a per-frequency resource basis, because some transceiver parts are shared for the processing of several distinct frequency resources. However, still more sophisticated designs may allow the selective activation, deactivation, or reconfiguration of various receiver and/or transmitter components in response to dynamic changes in the configuration of frequency resources, to minimize power consumption.

A potential problem with multi-carrier transceiver designs stems from the fact that events such as power-up, power-down, or reconfiguration of some blocks of a transceiver may not be acceptable while data is being received or transmitted on a frequency resource. Such events, even if they are carried out with respect to blocks that are not currently being used for transmission and/or reception, may nevertheless interfere with the operation of active blocks.

One reason for this is that such events can generate transient responses (for example, voltage and current spikes, voltage offsets, and other electromagnetic transients) that may be coupled to devices and nodes of active blocks through various elements, including, but not limited to, voltage/current supply wires and traces, capacitive and inductive coupling, substrate coupling, and thermal coupling. Bleed-over of these transient responses to active functional blocks of the transceiver may interfere with ongoing transmission and reception. This interference may be direct, for example, via coupling to nodes and devices operating on the desired signals, or indirect, for example, via coupling to nodes and devices that control the behavior (for example, gain, transfer function, oscillation frequency and others) of active functional blocks, or both.

In one particular example, the above-discussed transient responses occur in the context of performing measurements on a frequency resource. In the context of performing a measurement on a frequency resource, transients can occur because in some scenarios reception over the frequency resource to be measured must be switched on (and off). Switching on reception on the frequency resource to be measured may cause the above-described transients because switching on reception may affect blocks in the transceiver as discussed above.

Figure 2:
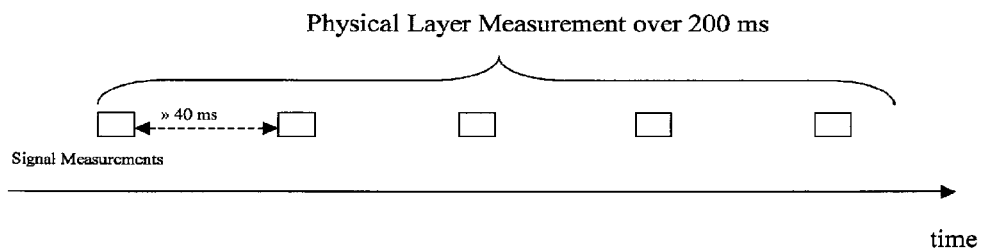
FIG. 2 illustrates an embodiment of a physical layer measurement.

In cellular systems, a mobile terminal needs to perform measurements on neighbor (intra frequency) cells on a regular basis. For instance, the terminal may perform a signal measurement (for example, RSRP or RSRQ based measurement) on the serving as well as on each detected neighbor cell. In one example, this can be done by taking a number (e.g., two to ten) of signal measurements ("snap shots") apart over time. FIG. 2 shows an embodiment of a physical layer measurement which is one example of the above-described measurement. One specific example of a physical layer measurement is an L1 measurement.

In the exemplary embodiment of FIG. 2, a set of five signal measurements is performed on a frequency resource over a given time frame. In the particular example illustrated in FIG. 2, the signal measurements are performed approximately 40 ms apart over a time frame of approximately 200 ms. The set of signal measurements may then be compiled to form a filtered physical layer measurement. Of course, sets of more or less signal measurements, for example sets of two to ten signal measurements, may be used.

In LTE-Advanced systems the mobile terminal should have procedures for efficient cell search and handover (HO) signal measurement. For example, the terminal may have to do regular measurements on all available frequency resources, to be able to find the best suitable serving cell. This may be done by performing physical layer measurements across frequency resources as shown in FIG. 2.

Using a physical layer measurement as an example, the mobile terminal may be configured to perform a physical layer measurement on frequency resources. The configuration(s) of the mobile terminal regarding the physical layer measurement may take place at initialization or at other times when the mobile terminal is turned on and in communication with a base station. More particularly, the mobile terminal may receive one or more configuration messages over time which configure the mobile terminal to perform physical layer measurements on one or more frequency resources. These configuration messages may be generated by a network or base station and communicated to the mobile terminal. Examples of filtered signal measurements and measurement configurations and requirements may be found, for example, in 3GPP Technical Specifications 36.331, 36.214, 36.133 and 36.311 (more specifically, in sections 5.5, 6.3.5 of TS 36.331 as well as the description of MeasObjectEUTRA, sections 5.1.1, 5.1.3 of TS 36.214 and section 4.2 of TS 36.133, and with regard to measurements on physical layer in TS 36.311).

Aspects of the technique discussed herein are drawn to averting or preventing the process of measurement(s) on a frequency resource affecting active transceiver blocks and communication over frequency resources. Further aspects of the technique discussed herein are drawn to preventing switching off reception on a frequency resource causing transients which may affect active transceiver blocks and communication over frequency resources.

Figure 3A:
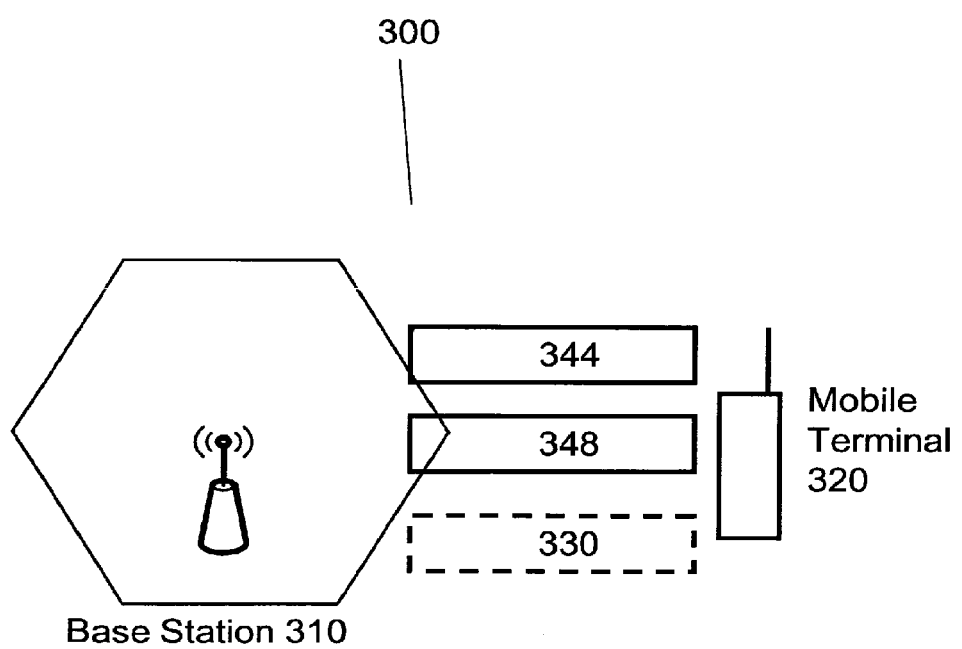
FIGS. 3a-3d schematically illustrate embodiments of managing frequency resources in a communication network and a mobile terminal associated therewith.

Turning first to averting or preventing the process of measurement(s) on a frequency resource affecting active transceiver blocks and communication over switched on (and perhaps currently utilized) frequency resources, FIG. 3a shows a simplified embodiment of a telecommunication system 300 comprising a base station 310 in communication with a mobile terminal 320. Mobile terminal 320 may be configured to perform a signal measurement with regard to a switched off frequency resource 330 which may be part of an unused portion of the available spectrum and which may be available for later use by mobile terminal 320. For example, mobile terminal 320 may have been configured to perform a physical layer measurement with regard to switched off frequency resource 330 as illustrated in FIG. 2.

In one particular example, mobile terminal 320 may have received a configuration message indicating that mobile terminal 320 is to perform a physical layer measurement with regard to switched off frequency resource 330. The configuration message may indicate parameters relating to the physical layer measurement procedure, such as the number of measurements, duration between measurements and type of measurements to be performed, for example Received Signal Strength Indication (RSSI), Reference Signal Received Power (RSRP), Reference Signal Received Quality (RSRQ), Signal-to-Noise Ratio (SNR), noise, interference, signal-to-interference ratio (SIR), and other measurements.

As shown in telecommunication system 300, base station 310 and mobile terminal 320 are operable to communicate with each other over two switched on frequency resources: frequency resource 344 and frequency resource 348. One of switched on frequency resources 344 or 348 could be an anchor or primary component carrier and the other frequency resource could be a secondary component carrier. In some configurations, the primary and secondary component carriers could be associated with different cells or base stations and may be referred to as primary cell (component carrier) and secondary cell (component carrier).

Figure 3B:
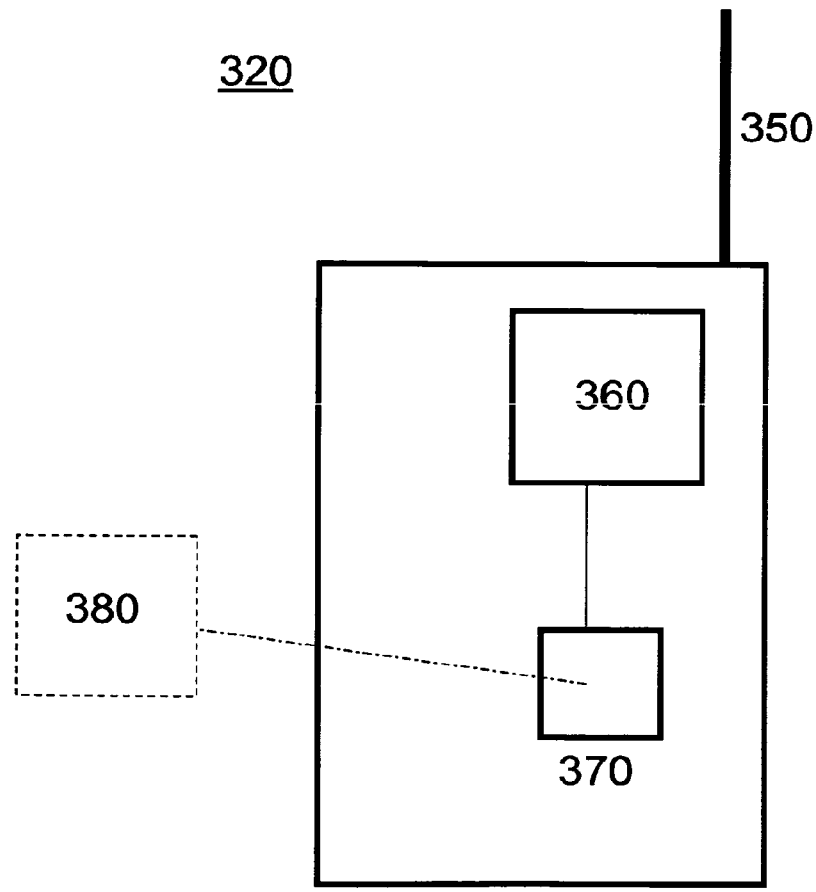

FIG. 3b depicts an embodiment of mobile terminal 320. Mobile terminal 320 includes an antenna 350 for communicating over one or more frequency resources. For example, by transmitting to or receiving control information and data from a base station. Although only one antenna 350 is illustrated with regard to mobile terminal 320, it will be appreciated that mobile terminal 320 could also comprise multiple antennas (e.g., to implement a multiple-input multi-output, or MIMO, scheme).

Mobile terminal 320 further includes a processor circuit 360 coupled to a memory 370. Memory 370 may include one or more programs 380 having computer instructions executable by processor circuit 360. The programs 380 are configured to control the processor circuit 360 to execute the method steps of the technique aspects discussed herein. More particularly, one or more of the steps performed by a mobile terminal set forth with regard to FIGS. 4a-4c and FIG. 6 below may be implemented by processor circuit 360 executing computer instructions of program(s) 380 stored in memory 370.

Figure 3C:
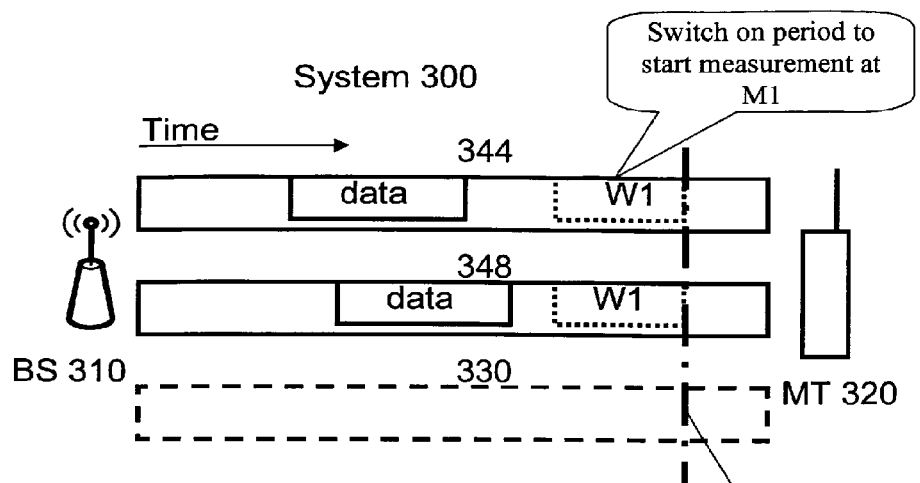
Figure 3D:
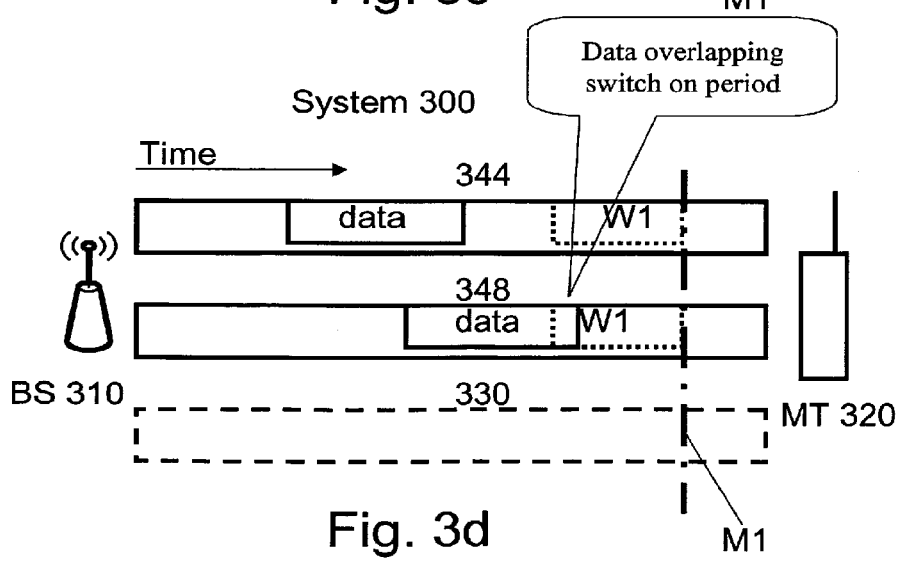

FIGS. 3c and 3d show data reception over switched on frequency resources 344 and 348 in the context of signal measurement embodiments to be performed as part of a physical layer measurement on currently switched off frequency resource 330. In FIG. 3c, data is to be received by mobile terminal 320 over frequency resources 344 and 348 outside of time window W1 relative to the time M1 at which signal measurement is to be started. In FIG. 3d, data is to be received by mobile terminal 320 over frequency resource 348 inside of time window W1 relative to the time M1 at which signal measurement is to be started. Time window W1 may define a time period related to the time period required for switching on currently switched off frequency resource 330 in order to perform the physical layer measurement. For example, in one aspect, time window W1 may encapsulate a time longer than the time period required for switching on frequency resource 330 by the time required for the resultant transients to die down such that data can be communicated over frequency resources 344 or 348 without disruption or loss of communication ability at the mobile terminal transceiver. In one example, such a time period may be on the order of 100 us to 1 ms.

As shown in FIG. 3c, if data is to be received outside of time window W1 relative to M1, then transients (for example, switching or measurement transients) will likely not disrupt data communication over frequency resources 344 or 348, and once it has been ascertained that communication over frequency resources 344 or 348 falls outside of window W1 relative to signal measurement start time M1, the signal measurement is taken in accordance with the physical layer measurement configuration at mobile terminal 320.

If, however, as shown in FIG. 3d, data is to be received inside of time window W1 relative to signal measurement start time M1, then transients may well disrupt data communication over switched on frequency resources 344 or 348. Consequently once it has been ascertained that communication over active frequency resource 348 falls inside of window W1 relative to signal measurement start time M1, the physical layer measurement as configured at mobile terminal 320 is modified (i.e., adjusted). More particularly, the physical layer measurement may be modified or adjusted by skipping a configured signal measurement on frequency resource 330, and/or using a previously taken signal measurement on frequency resource 330 or by performing a delayed signal measurement on frequency resource 330.

Figure 4A:
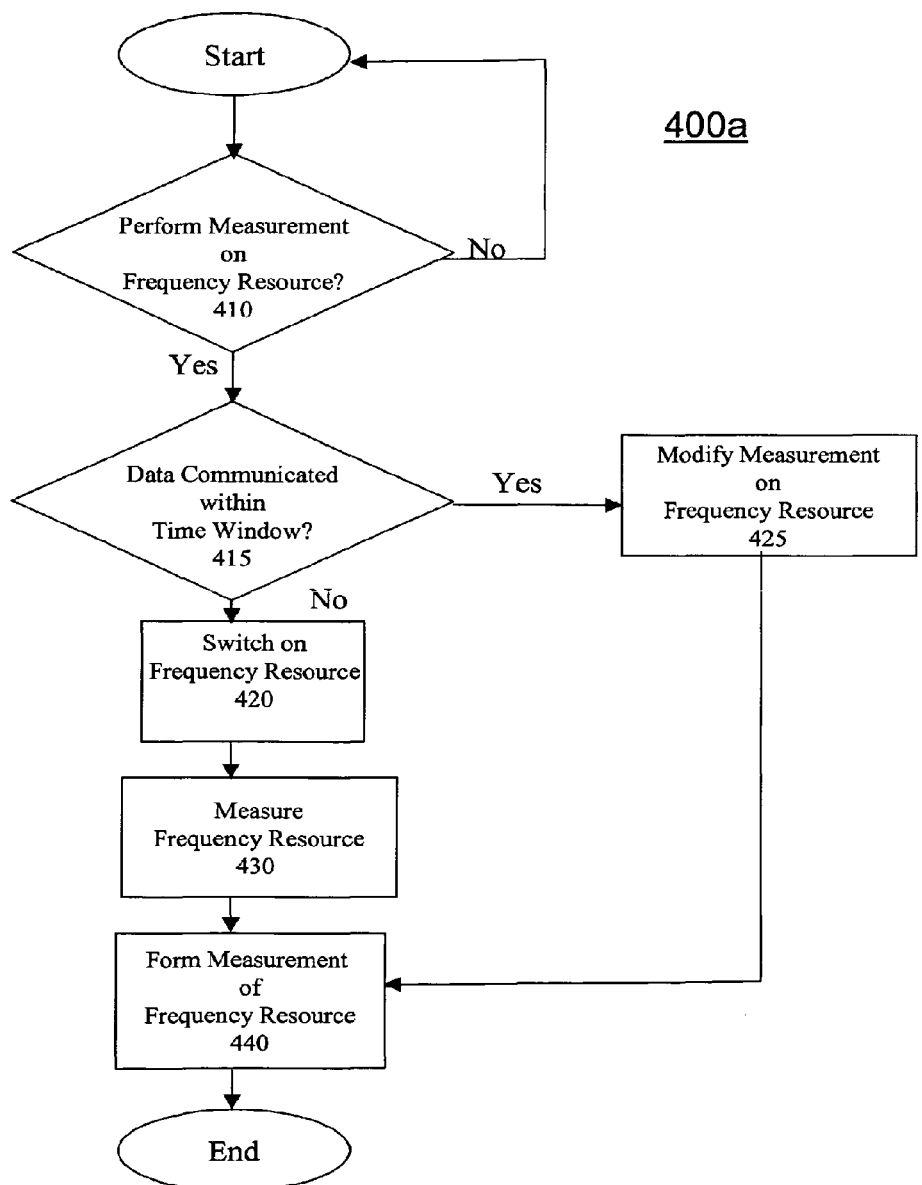
FIGS. 4a-4c show flow diagrams of method embodiments for managing frequency resources in a communication network.
Figure 4B:
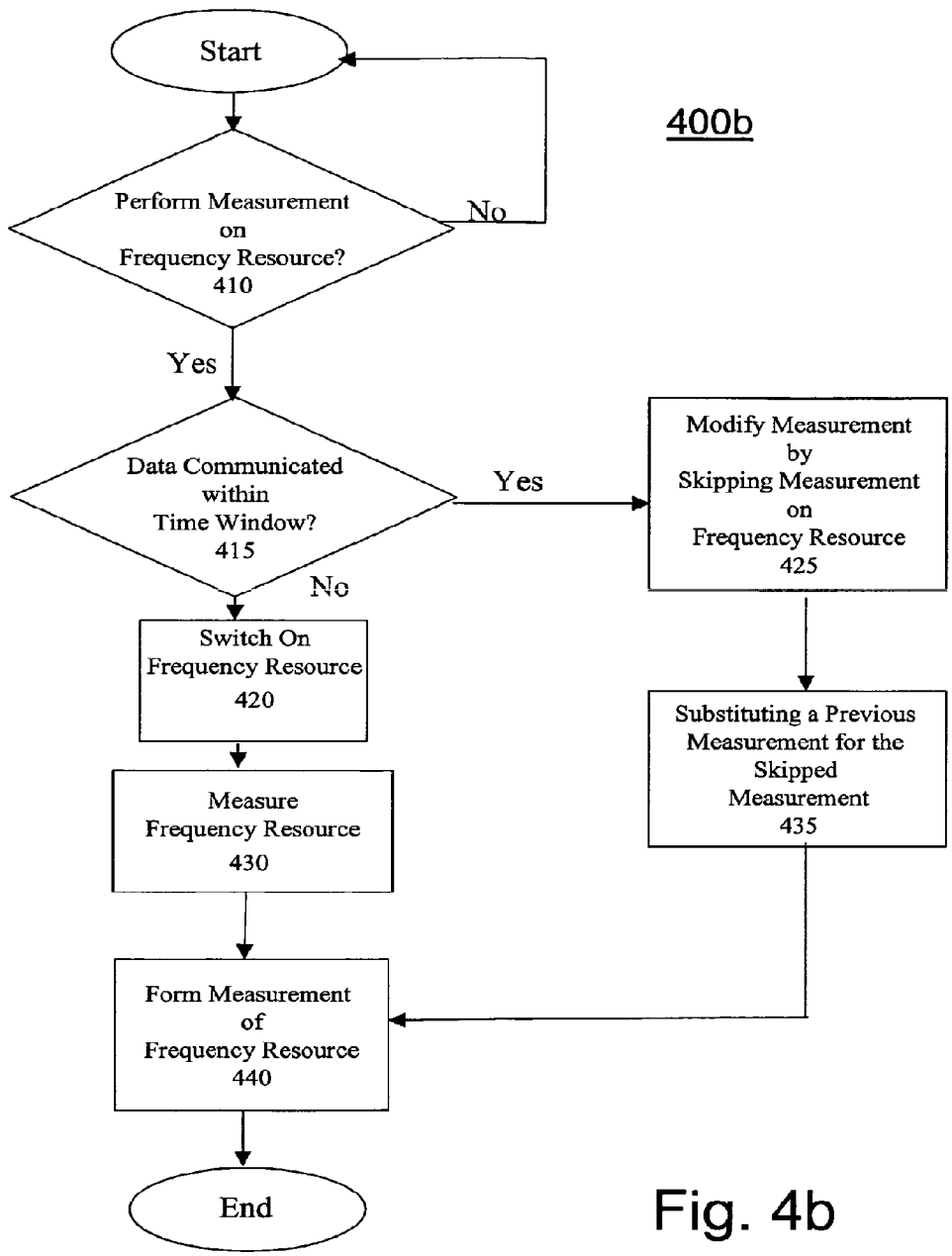
Figure 4C:
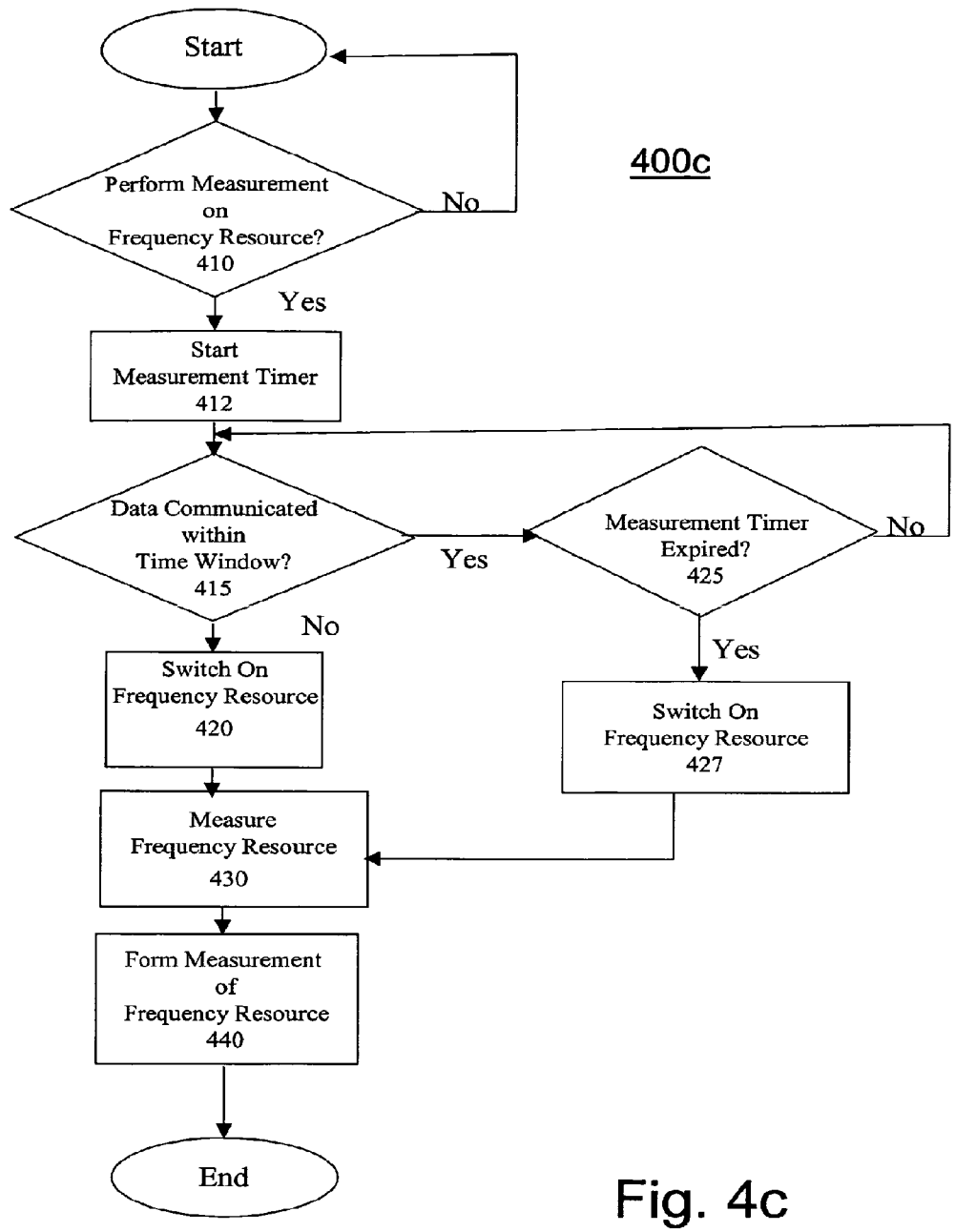

FIGS. 4a-4c provide flowcharts illustrating examples of the above technique. Turning first to FIG. 4a, at step 410 of flowchart 400a, the mobile terminal determines whether it is to perform a measurement on currently switched off frequency resource 330 in the near future. If that is the case, at step 415, the mobile terminal determines whether there is data to be communicated over a switched on frequency resource, such as switched on frequency resources 344 or 348 within time period or time window W1. In one implementation, determining whether there is data to be communicated over a switched on frequency resource is done by monitoring a control channel, for example the PDCCH in LTE/LTE-Advanced systems.

If it is determined at step 415 that no data is to be communicated over a switched on frequency resource inside of time window W1, at step 420, switched off frequency resource 330 is then switched on during a time T<W1. Subsequently, at step 430, mobile terminal 320 measures now switched on frequency resource 330 in accordance with the configured physical layer measurement. As discussed above, the configured physical layer measurement may include performing a signal measurement on frequency resource 330. As shown at step 440, the newly acquired signal measurement together with previously acquired signal measurements are compiled (e.g., aggregated) and a filtered (e.g., averaged) physical layer measurement of frequency resource 330 is formed.

If, however, it is determined at step 415 that there is data to be communicated over a switched on frequency resource during window W1, the terminal makes an adjusted physical layer measurement. Adjusting (or modifying) the physical layer measurement may include deviating from the physical layer measurement as configured.

As shown at step 425 in FIGS. 4a, 4b, the physical layer measurement is adjusted/modified. As shown in step 425 of FIG. 4b, modifying the physical layer measurement may involve skipping a signal measurement to be performed as part of the configured physical layer measurement. For purposes of further discussion of FIGS. 4a, 4b, it is assumed that a single signal measurement is skipped at step 425. Of course in other examples, more than one signal measurement to be performed as part of a configured physical layer measurement may be skipped at step 425. As shown the embodiment of FIG. 4a, at step 440, previously acquired signal measurements with regard to frequency resource 330 are compiled and a physical layer filtered measurement of frequency resource 330 is formed without the skipped signal measurement. As shown the embodiment of FIG. 4b, at step 435, a previously acquired signal measurement is substituted for the skipped signal measurement. Subsequently, at step 440 of flowchart 400b, the substituted previous signal measurement is compiled with previous signal measurements and a physical layer measurement of frequency resource 330 is formed without the skipped signal measurement. In further embodiments, more than one signal measurement configured as part of a physical layer measurement may be substituted as illustrated in FIG. 4b.

FIG. 4c shows a flow chart illustrating another embodiment which uses a timer. In this embodiment, one or more signal measurements to be performed as part of the configured physical layer measurement may be delayed in relation to the configured measurement times and/or the rate at which the measurements are to be performed. As in the flowcharts of FIGS. 4a, 4b, at step 410 of FIG. 4c, the mobile terminal determines whether it is to perform a measurement on switched off frequency resource 330 in the near future. If the mobile terminal is to perform such a measurement, at step 412, a measurement timer is started. Such a measurement timer could be a timer internal to the mobile terminal. As in the embodiments illustrated in FIGS. 4a, 4b, at step 415, the mobile terminal determines whether there is data to be communicated over a switched on frequency resource, such as switched on frequency resources 344 or 348 within time window W1.

If it is determined at step 415 that no data is to be communicated over a switched on frequency resource inside of window W1, the flowchart proceeds through steps 420-440 similar to the embodiments illustrated in FIGS. 4a, 4b to form a physical layer measurement of frequency resource 330 as discussed above with regard to FIGS. 4a, 4b.

If, however, it is determined at step 415 that there is data to be communicated over an active frequency resource during time period or time window W1, as in the embodiments illustrated in FIGS. 4a, 4b, the terminal makes an adjusted physical layer filtered measurement. As shown at step 425 in FIG. 4c, mobile terminal 320 checks whether the measurement timer started at step 412 has expired. If not, then the mobile terminal waits to perform a signal measurement on the measured frequency resource. If, however, at step 425, it is determined that the measurement timer has expired, at step 427, the mobile terminal proceeds to switch on the frequency resource and perform one or more delayed signal measurements on the frequency resource at step 430. Subsequently, at step 440, the delayed signal measurement may be filtered or otherwise combined with previous signal measurements to form an adjusted physical layer measurement. Meanwhile, subsequent to step 427, the mobile terminal may attempt to receive and decode communicated data received over other frequency resources such as the anchor component carrier despite the possible disruptions due to transients caused by switching on the frequency resource to be measured. In another aspect of the technique, as a possible alternative to attempting to receive communicated data during a transient-plagued period following the switch on, the mobile terminal may transmit a NAK in response to communicated data packets received over the anchor carrier or other frequency resources, and rely on retransmissions such as Hybrid Automatic Repeat reQuest (HARQ) retransmissions for the interfered data.

As discussed previously, transients can also occur when switching off a frequency resource and such transients can affect data communication over the remaining switched on frequency resources such as an anchor component carrier. The above principles can be extended to combat this problem. More particularly, switching off of a frequency resource can be managed relative to data communication over other frequency resources to avert or prevent the resultant transients from disrupting data communication over the other frequency resources.

Figure 5A:
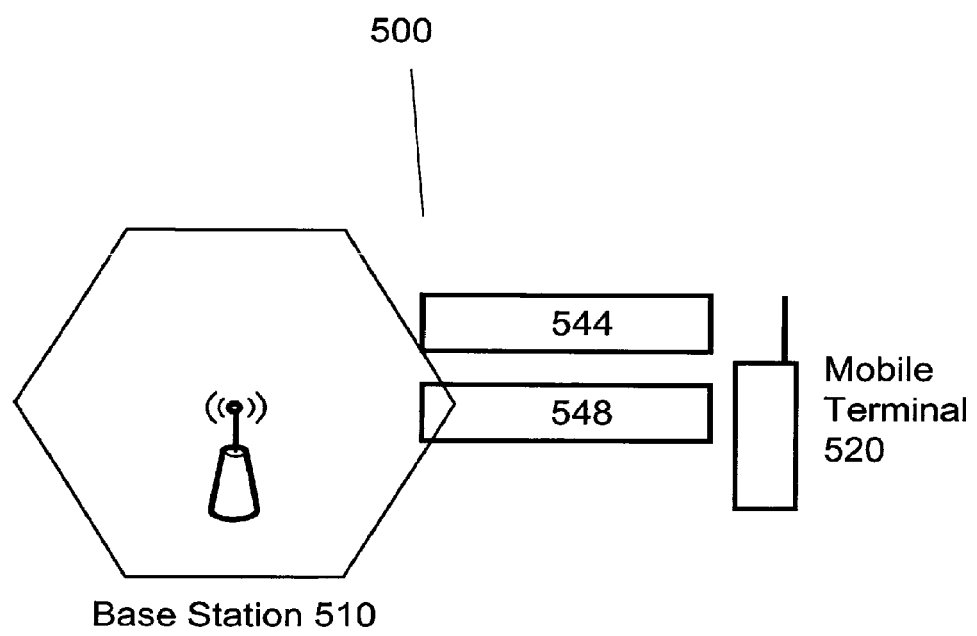
FIGS. 5a-5c schematically illustrate further embodiments of managing frequency resources in a communication network.

Turning now to FIG. 5a, FIG. 5a shows a simplified example telecommunication system 500 comprising a base station 510 in communication with a mobile terminal 520 (similar to the scenario of FIG. 3a).

As shown in example telecommunication system 500, base station 510 and mobile terminal 520 are configured such that they communicate with each other over two switched on frequency resources: switched on frequency resource 544 and switched on frequency resource 548. One of switched on frequency resource 544 or 548 could be an anchor or primary component carrier and the other frequency resource could be a secondary component carrier. In some configurations, the primary and secondary component carriers could be associated with different cells or base stations and may be referred to as primary cell (component carrier) and secondary cell (component carrier). For purposes of the following explanation, it is specified that frequency resource 548 is to be switched off. For example, frequency resource 548 may have been switched on for purposes of a physical layer measurement, such as that described above. In one example of an alternative, frequency resource 548 may have been switched on in the past as a supplement to frequency resource 544, which in this example may be an anchor or primary component carrier, to expand the bandwidth available for communication with regard to mobile terminal 520 and the additional bandwidth provided by frequency resource 548 may no longer be needed and as such it may be desirable to switch off frequency resource 548 to conserve power at mobile terminal 520.

Figure 5B:
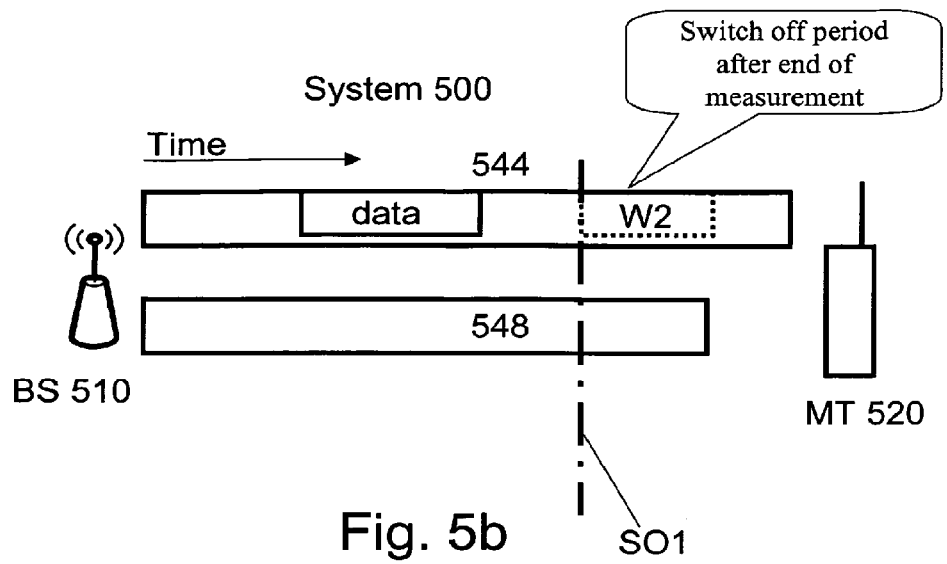
Figure 5C:
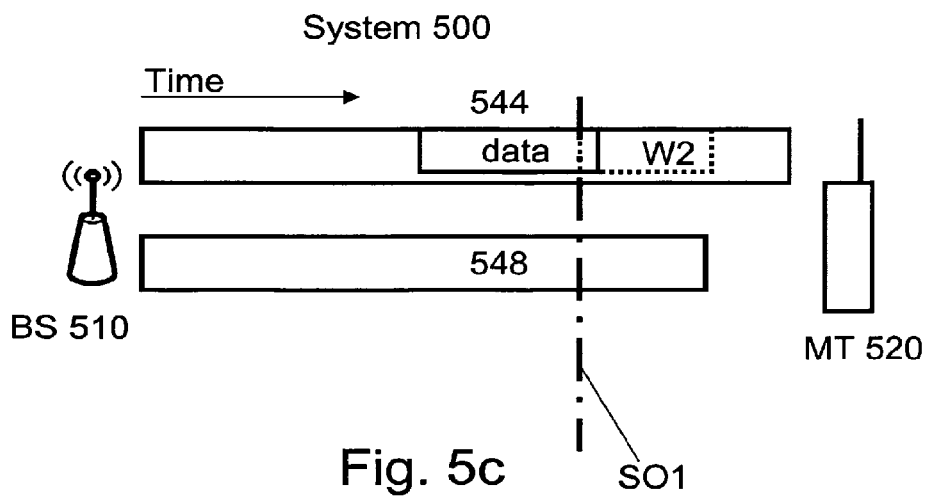

FIGS. 5b and 5c show data reception over frequency resource 544 in the context of switching on reception on frequency resource 548. In FIGS. 5b and 5c, reception on frequency resource 548 is to be switched off at time SO1. In FIG. 5b, data is to be communicated over, in this particular example, received over frequency resource 544 at mobile terminal 520 outside of time period or time window W2 relative to time SO1. In FIG. 5c, data is to be communicated over, in this particular example, received over frequency resource 544 at mobile terminal 520 inside of time window W2 relative to time SO1. Time window W2 may define a time period related to the time period required for switching off reception over frequency resource 548 at mobile terminal 520. For example, in one aspect, time window W2 may encapsulate a time longer than the time period required for switching off reception on switched on frequency resource 548 by the time required for the transients in mobile terminal 520 to die down such that data can be communicated over switched on frequency resource 544 without loss of communication ability at mobile terminal 520. In one example, such a time period may be on the order of 100 µs to 1 ms.

As shown in FIG. 5b, reception on frequency resource 548 is to be switched off at switch off time SO1. Because data communication over remaining switched on frequency resource 544 takes place outside of time window W2 relative to switch off time SO1, transients will likely not disrupt data communication over remaining switched on frequency resource 544 and once it has been ascertained that communication over remaining switched on frequency resource 544 falls outside of window W2 relative to switch off time SO1, reception on frequency resource 548 may be switched off at mobile terminal 520 at switch off time SO1.

If, however, as shown in FIG. 5c, data communication occurs inside of time window W2 relative to switching off reception on frequency resource 548, then transients may well disrupt the data communication over remaining switched on frequency resource 544. Consequently if it is ascertained that communication over remaining switched on frequency resource 544 occurs inside of window W2 relative to switching off reception on frequency resource 548, switching off reception on frequency resource 548 at mobile terminal 520 may be delayed. More particularly, switching off reception on frequency resource 548 at mobile terminal 520 may be delayed to provide a full window W2 relative to data communication over remaining switched on frequency resource 544 to prevent transients from interfering with communication over remaining switched on frequency resource 544.

Figure 6:
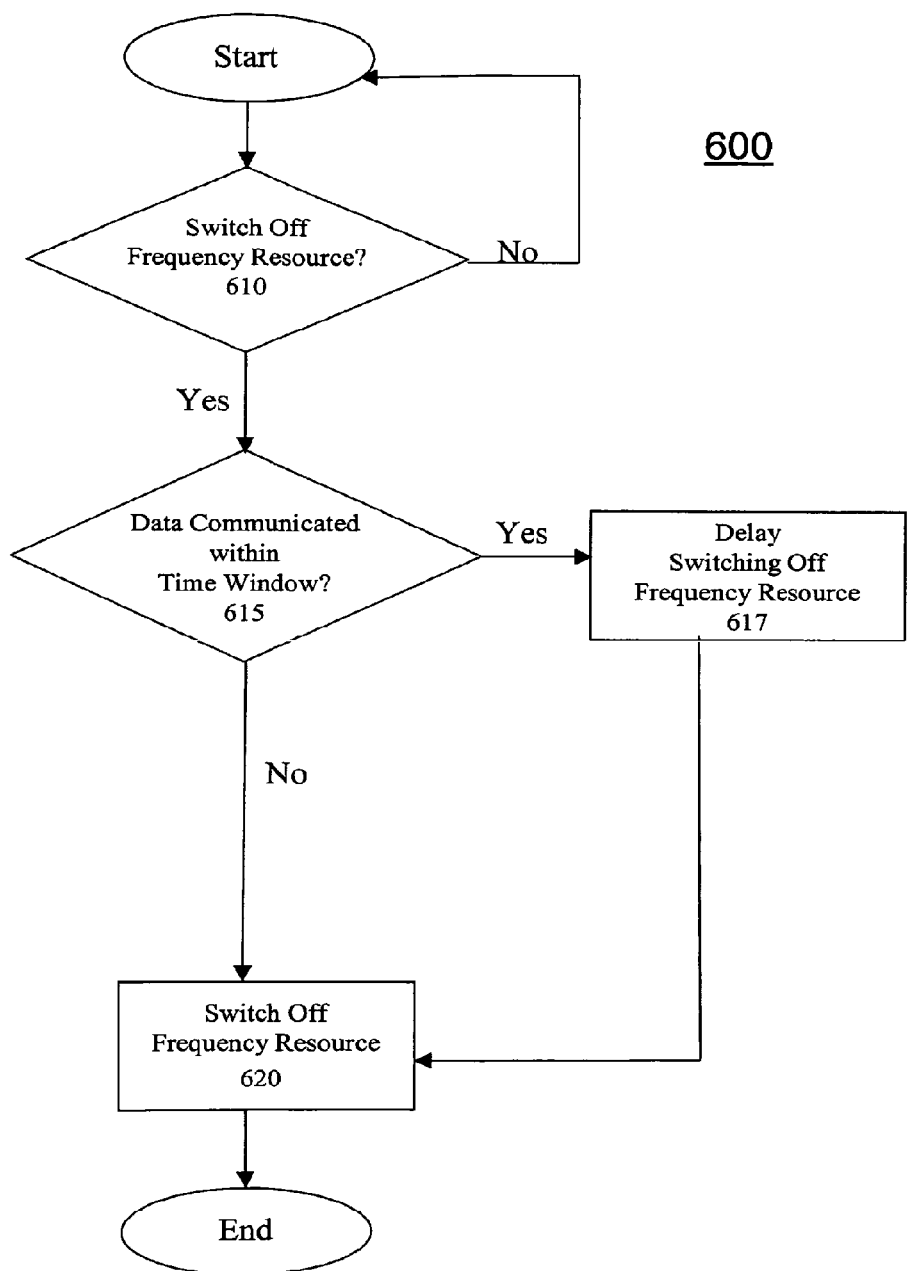
FIG. 6 shows a flow diagram of a further method embodiment for managing frequency resources in a communication network.

FIG. 6 provides flowchart 600 illustrating an example of the above technique. At step 610 of flowchart 600, mobile terminal 520 determines whether it is to switch off reception on currently switched on frequency resource 548 in the near future. If that is the case, at step 615, mobile terminal 520 determines whether there is data to be communicated over remaining switched on frequency resource 544 within time window W2. In one implementation, determining whether there is data to be communicated over switched on frequency resource 544 is done by monitoring a control channel, for example the PDCCH in LTE/LTE-Advanced systems.

If it is determined at step 615 that no data is to be communicated over a switched on frequency resource inside of window W2, at step 620, reception on frequency resource 548 is switched off.

If, however, it is determined at step 615 that there is data to be communicated over remaining switched on frequency resource 544 during window W2, at step 617 mobile terminal 520 delays switching off reception on frequency resource 548 until the communicated data is received and a window W2 exists as a buffer between receiving further data over remaining switched on frequency resource 544. When such a buffer window W2 exists as a buffer between receiving further data over remaining switched on frequency resource 544, the method proceeds to step 620 and reception on frequency resource 548 is switched off.

As has become apparent, the above-disclosed embodiments provide for managing turning on and off reception on a frequency resource relative to other frequency resources to manage, control and prevent transients from disrupting communication on other frequency resources. More particularly, in the context of performing physical layer measurement(s) on a frequency resource, embodiments provide for managing, controlling and preventing resultant transients due to switching on a frequency resource for measurement from affecting data communication over other frequency resources.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A mobile terminal operable to communicate over one or more distinct frequency resources, said mobile terminal configured to:
   determine that the mobile terminal is to perform a physical layer measurement with regard to a first frequency resource;
   determine if there is data to be communicated over one or more second frequency resource(s) within a time period, wherein the time period is based on a switching on time for switching on reception on the first frequency resource and wherein the first frequency resource is distinct from the second frequency resource(s);
   if it is determined that there is no data to be communicated over the second frequency resource(s) within the time period, perform the physical layer measurement on the first frequency resource and form a quality measure of the first frequency resource based on the physical layer measurement; or
   if it is determined that there is data to be communicated over the second frequency resource(s) within the time period, skipping performing the physical layer measurement on the first frequency resource, and forming a quality measure of the first frequency resource based on the a previous physical layer measurement.

2. The mobile terminal of claim 1, wherein the performing the physical layer measurement comprises performing multiple signal measurements.

3. The mobile terminal of claim 2, wherein performing the physical layer measurement comprises performing the multiple signal measurements on the first frequency resource serially over time, wherein a signal measurement measures the first frequency resource at a point in time.

4. The mobile terminal of claim 3, wherein the performed or skipped signal measurement includes at least one of a signal strength, a noise, a signal to noise, an interference, a signal-to-interference, an RSSI, an RSRQ, and a RSRP measurement.

5. The mobile terminal of any of claims 1 to 4, said mobile terminal configured to:
   upon determining that a signal measurement on the first frequency resource is overdue, perform a delayed signal measurement on the first frequency resource, and utilize the delayed signal measurement to form the quality measure of the first frequency resource.

6. The mobile terminal of claim 5, wherein said mobile terminal is further configured to determine that a signal measurement on the first frequency resource is overdue by:
   starting a signal measurement timer upon determining that the physical layer measurement is to be performed; and
   subsequent to starting the signal measurement timer, determining that said signal measurement timer has expired.

7. The mobile terminal of claim 6, wherein said mobile terminal is further configured to decode a data portion received during switching on reception on the first frequency resource.

8. The mobile terminal of claim 6, wherein said mobile terminal is further configured to transmit a NAK in response to receiving a data portion during switching on reception on the first frequency resource and subsequently rely on retransmissions to decode a data portion received over the second frequency resource(s).

9. The mobile terminal of claim 1, wherein said mobile terminal is further configured to switch off reception on the first frequency resource subsequent to forming the quality measure.

10. A method performed in a mobile terminal, said method comprising:
  determining that the mobile terminal is to perform a physical layer measurement with regard to a first frequency resource;
  determining if there is data to be communicated over one or more second frequency resource(s) within a time period, wherein the time period is based on a switching on time for switching on reception on the first frequency resource and wherein the first frequency resource is distinct from the second frequency resources;
  if it is determined that there is no data to be communicated over the second frequency resource(s) within the time period, performing the physical layer measurement on the first frequency resource and forming a quality measure of the first frequency resource based on the physical layer measurement; or
  if it is determined that there is data to be communicated over the second frequency resource(s) within the time period, skipping performing the physical layer measurement on the first frequency resource and forming a quality measure of the first frequency resource based on the previous physical layer measurement.

11. The method of claim 10, wherein performing the physical layer measurement comprises performing multiple signal measurements.

12. The method of claim 11, wherein performing the physical layer measurement comprises performing the multiple signal measurements on the first frequency resource serially over time, wherein a signal measurement measures the first frequency resource at a point in time.

13. The method of claim 12, wherein the performed or skipped signal measurement includes at least one of a signal strength, a noise, a signal to noise, an interference, a signal-to-interference, an RSSI, an RSRQ, and a RSRP measurement.

14. The method of any of claims 10 to 13, said method further comprising:
  upon determining that a signal measurement on the first frequency resource is overdue, performing a delayed signal measurement on the first frequency resource, and utilizing the delayed signal measurement to form the quality measure of the first frequency resource.

15. The method of claim 14, said method determining that a signal measurement on the first frequency resource is overdue by:
  starting a signal measurement timer upon determining that the physical layer measurement is to be performed; and
  subsequent to starting the signal measurement timer, determining that said signal measurement timer has expired.

16. The method of claim 15, further comprising decoding a data portion received during switching on reception on the first frequency resource.

17. The method of claim 15, further comprising transmitting a NAK in response to receiving a data portion during switching on reception on the first frequency resource and subsequently relying on retransmissions to decode a data portion received over the second frequency resource(s).

18. The method of claim 10, further comprising switching off reception on the first frequency resource subsequent to forming the quality measure.

19. A mobile terminal operable to communicate over one or more distinct frequency resources, said mobile terminal configured to:
  determine that the mobile terminal is to perform a physical layer measurement with regard to a first frequency resource;
  determine if there is data to be communicated over one or more second frequency resource(s) within a time period, within a time period, wherein the time period is between a switching on time for switching on reception on the first frequency resource and signal measurement start time, and wherein the first frequency resource is distinct from the second frequency resource(s);
  if it is determined that there is no data to be communicated over the second frequency resource(s) within the time period, perform the physical layer measurement on the first frequency resource and form a quality measure of the first frequency resource based on the physical layer measurement; or
  if it is determined that there is data to be communicated over the second frequency resource(s) within the time period, delaying performing the physical layer measurement on the first frequency resource until the data has been communicated over the second frequency resource(s), and forming a quality measure of the first frequency resource based on the delayed physical layer measurement.

20. The mobile terminal of claim 19, wherein the physical layer measurement comprises performing multiple signal measurements.

21. The mobile terminal of claim 20, wherein the physical layer measurement comprises performing the multiple signal measurements on the first frequency resource serially over time, wherein a signal measurement measures the first frequency resource at a point in time.

22. The mobile terminal of claim 21, wherein the signal measurement includes at least one of a signal strength, a noise, a signal to noise, an interference, a signal-to-interference, an RSSI, an RSRQ, and a RSRP measurement.

23. A method performed in a mobile terminal, said method comprising:
  determining that the mobile terminal is to perform a physical layer measurement with regard to a first frequency resource;
  determining if there is data to be communicated over one or more second frequency resource(s) within a time period, wherein the time period is between a switching on time for switching on reception on the first frequency resource and signal measurement start time, and wherein the first frequency resource is distinct from the second frequency resource(s);
  if it is determined that there is no data to be communicated over the second frequency resource(s) within the time period, performing the physical layer measurement on the first frequency resource and forming a quality measure of the first frequency resource based on the physical layer measurement; or
  if it is determined that there is data to be communicated over the second frequency resource(s) within the time period, delaying performing the physical layer measurement on the first frequency resource until the data has been communicated over the second frequency resource(s), and forming a quality measure of the first frequency resource based on the delayed physical layer measurement.

24. The method of claim 23, wherein performing the physical layer measurement comprises performing multiple signal measurements.

25. The method of claim 24, wherein performing the physical layer measurement comprises performing the multiple signal measurements on the first frequency resource serially over time, wherein a signal measurement measures the first frequency resource at a point in time.

26. The method of claim 25, wherein the performed signal measurement includes at least one of a signal strength, a noise, a signal to noise, an interference, a signal-to-interference, an RSSI, an RSRQ, and a RSRP measurement.

* * * * *